UNITED STATES PATENT OFFICE.

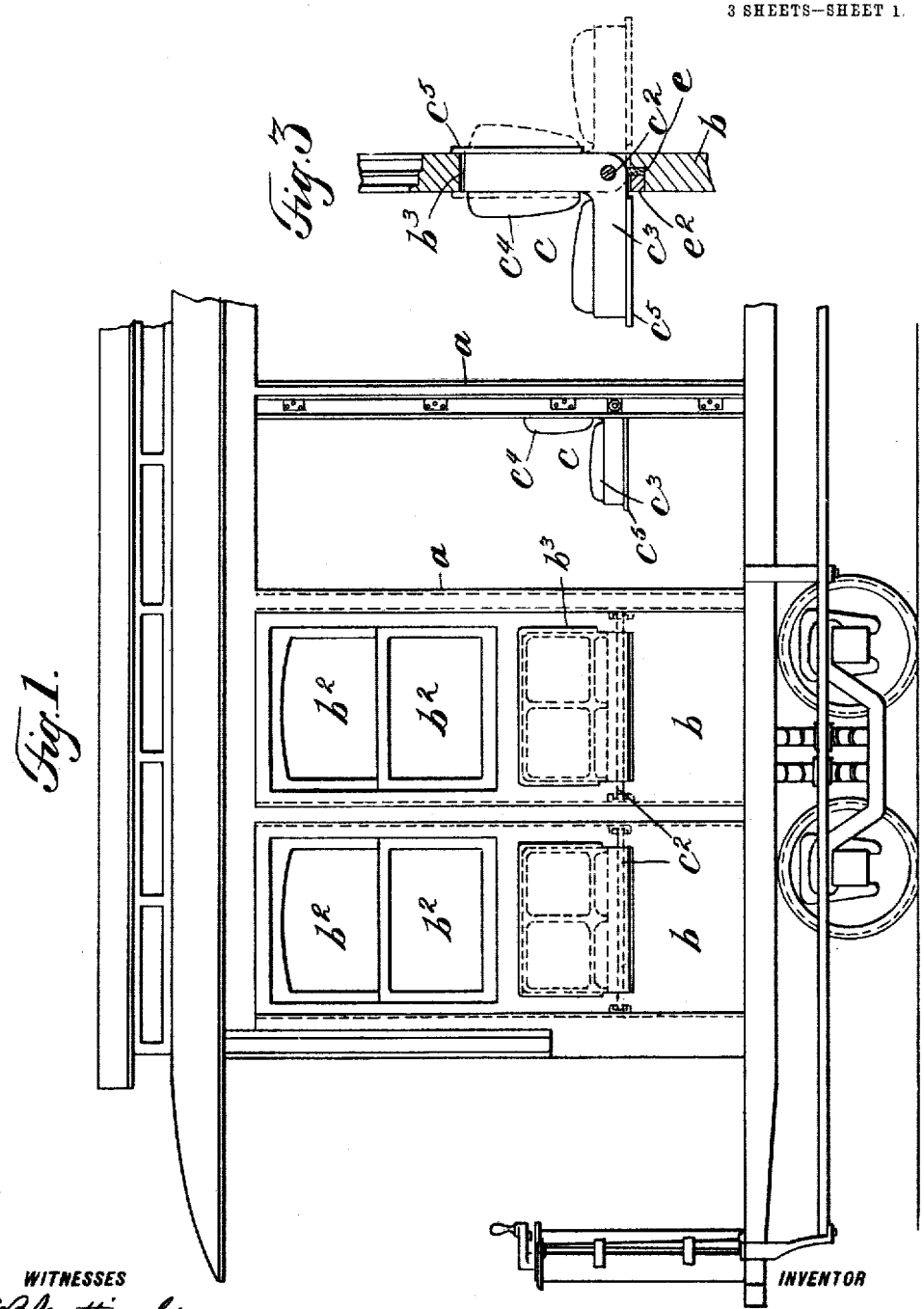

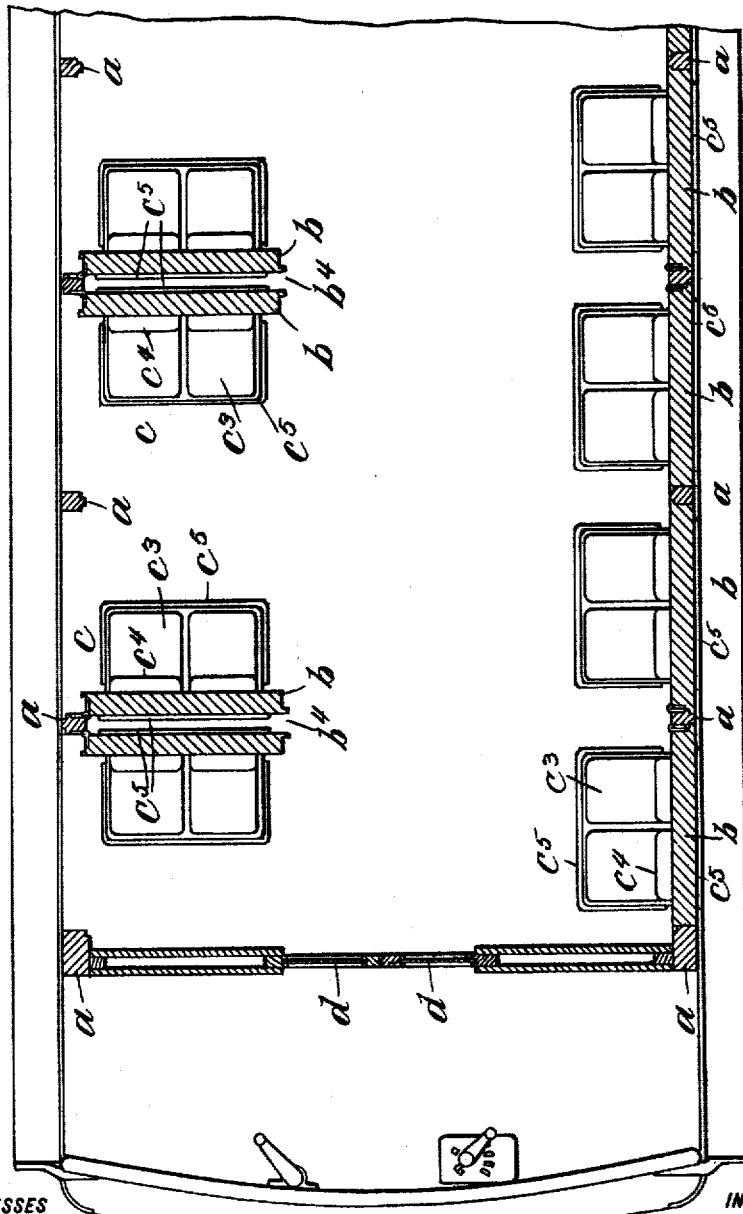

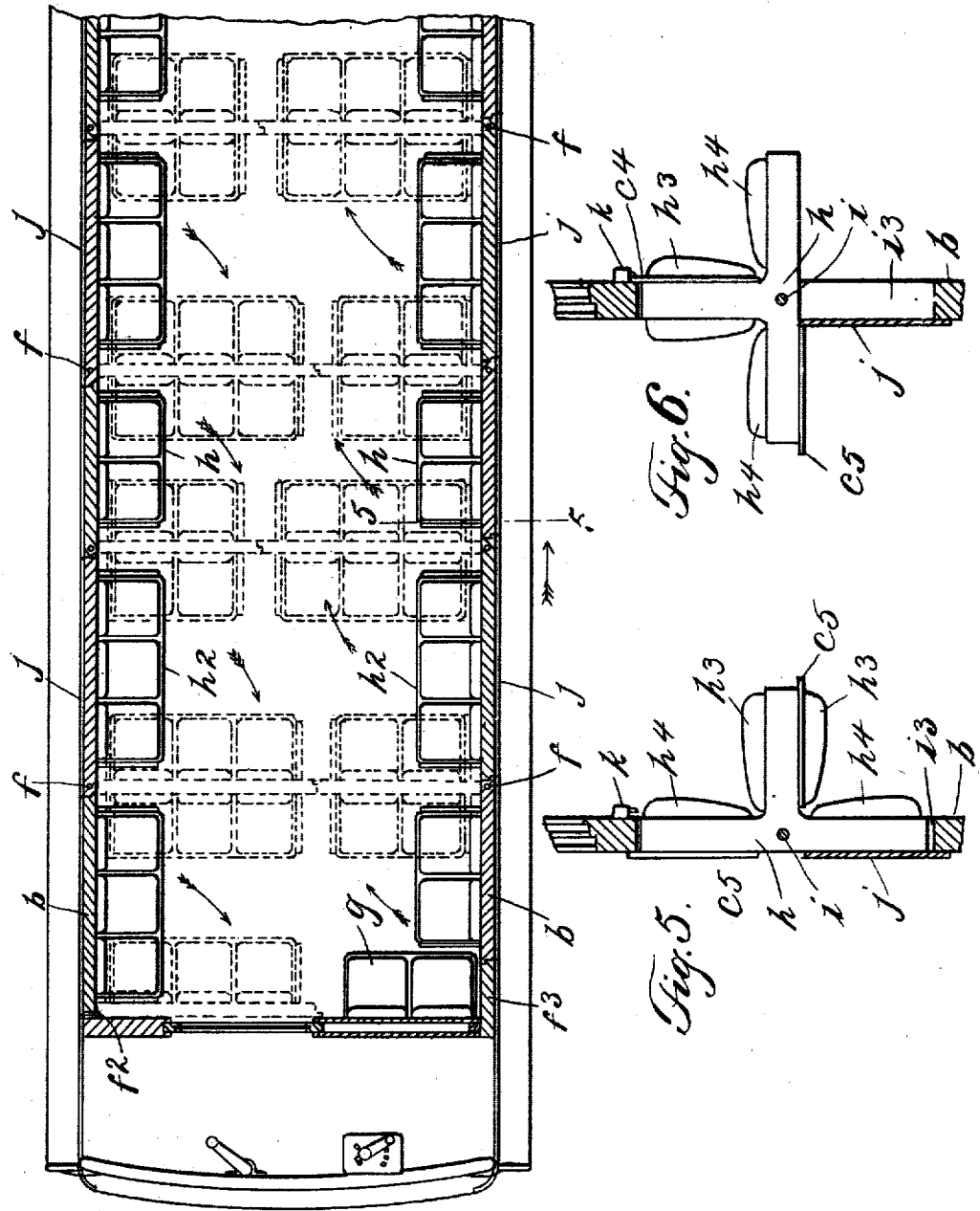

WILLIAM JAMES HERBERT, OF NEW YORK, N. Y.

STREET-CAR.

No. 814,043.　　Specification of Letters Patent.　　Patented March 6, 1906.

Application filed January 19, 1904. Renewed January 19, 1906. Serial No. 296,826.

*To all whom it may concern:*

Be it known that I, WILLIAM JAMES HERBERT, a subject of the King of Great Britain, residing at New York, in the county of New York and State of New York, have invented certain new and useful Improvements in Street-Cars, of which the following is a specification, such as will enable those skilled in the art to which it appertains to make and use the same.

The object of this invention is to provide an improved street-car which may be used either as an open or closed car, a further object being to provide a car of the class specified which may be used either on surface or elevated roads and which may be converted into an open car in fair and warm weather or into a closed car for use in cold or stormy weather whenever desired; and with these and other objects in view the invention consists in a car of the class constructed as hereinafter described and claimed.

The invention is fully disclosed in the following specification, of which the accompanying drawings form a part, in which the separate parts of my improvement are designated by suitable reference characters in each of the views, and in which—

Figure 1 is a side view of a part of a car made according to my invention; Fig. 2, a sectional plan view thereof; Fig. 3, a sectional side view showing a detail of the construction; Fig. 4, a view similar to Fig. 2, but showing a modification; Fig. 5, a partial section on the line 5 5 of Fig. 4; and Fig. 6, a view similar to Fig. 5, but showing the parts in a different position.

In the practice of my invention I provide a car of the usual form, except that the sides thereof instead of being permanently closed in or permanently open are provided with vertically-arranged stanchions $a$, which are arranged at intervals, and to the alternate stanchions on each side are hinged doors $b$. The intervening stanchions are those to which the doors are not hinged, being so formed as to permit the doors to fold thereon or connect therewith, so as to completely close the sides of the car when desired. Each of the doors $b$ is preferably provided in the top portion thereof with the usual windows $b^2$, and in the bottom portion of each is formed an opening $b^3$, as clearly shown in Figs. 1 and 3, and in each of these openings is pivoted a seat $c$, the pivotal connection being made at the bottom portion of the opening by means of a rod $c^2$. Each of the seats $c$ consists of two parts $c^3$ and $c^4$, and when one of these parts is in a horizontal position for use as a seat the other part extends upwardly at right angles thereto and closes the opening $b^3$ in the door, and in Fig. 3 one of said seats is shown in one position in full lines and in the other position in dotted lines. Each part of the seats $c$ is also provided with a bottom or back flange $c^5$, and these flanges strike on the opposite sides of the door, so as to hold the seat in proper position, and when the doors are closed, so as to close the opposite sides of the car, one part of the seats projects inwardly in the manner of ordinary seats, while the other part fills the opening $b^3$, and the flange $c^5$ thereof presses against the outer side of the door, and the opening $b^3$ is securely closed. When it is desired to open the sides of the car or to convert the car into an open car, the doors $b$ are swung inwardly, as shown at $b^4$ in Fig. 2, and secured in this position in any desired manner.

In Fig. 2 of the drawings the doors and seats at one side are shown in position to close the car, while the doors and seats at the other side are shown in position to form an open car, and any suitable means may be provided for locking the doors in the closed position and for locking them in the open position, as shown in said figure. I have also shown in Fig. 2 one end of the car provided with sliding doors $d$, and in practice the car, with the exception of the side portions thereof, may be constructed in the usual or any desired manner.

In the form of construction shown the doors are hinged to the alternate stanchions, and in this form of construction the seats when the doors are open or the car converted into an open car will extend in opposite directions; but it will be apparent that one door may be hinged to each stanchion, in which event the seats will all extend in the same direction when the doors are open or the car converted into an open car.

In the form of construction shown both parts of the seats are upholstered. When one part is in position for use, the other forms a back, rest, or support. It will be apparent, however, that plain or unupholstered seats may be employed and the operation will be the same.

I also place at the bottom of the openings in the doors in which the seats are hinged a transverse packing $e$, as shown in Fig. 3, which bears on the bottom of the seat or seats and which is designed to make a close connection between the bottom portions of the seats and the bottom of the opening $b^3$, and this packing $e$ is secured in place by a strip $e^2$ in the form of construction shown.

In Figs. 4 and 6 I have shown a modification in which the stanchions $a$ are omitted and the doors $b$ are hinged in position by means of vertically-arranged rods $f$, to which said doors are hinged or with which said doors are connected in such manner that they are free to swing thereon. One end of the car is also shown in Fig. 4, and one of the doors $b$, at one side thereof, is hinged at $f^2$, so as to swing inwardly, and this hinge may be made by means of a rod $f$ or in any other way, and at the opposite side is a vertically-arranged stationary plate or similar frame member $f^3$, and the end of the car adjacent thereto is provided with a seat $g$, which is preferably connected with the end of the car so as to be slightly raised, so as to permit the adjacent door $b$ to swing inwardly. All the other side doors in this form of construction are provided either with two or three seats, as shown at $h$ and $h^2$, respectively, and these seats are composed of three parts, two of which are in the same plane and one arranged centrally of the other two parts and at right angles thereto, as clearly shown in Figs. 5 and 6. These seats are pivoted in the doors $b$, as shown at $i$, and said doors are provided with openings $i^3$, in which the seats are pivoted, and when the doors are closed the seats are arranged as shown in Fig. 5, one part, $h^3$, as shown in Fig. 5, serving as a seat, while the other parts $h^4$ close the opening $i^3$ in the door. When the doors are open, as shown in dotted lines in Fig. 4, the seats are in the position shown in Fig. 6, the parts $h^4$ being in horizontal position at each side of the door, while the part $h^3$ serves to close the top portion of the opening $i^4$, the bottom portion thereof being closed by a plate $j$, secured to the outer side of the door. In this form of construction the doors and seats when the doors are open and the car is turned into an open car extend clear across the car, as shown in dotted lines in Fig. 4, and when the doors are closed or the car converted into a closed car the seats are all at the opposite sides of the car. This part of my invention, as shown in Figs. 4 to 6, inclusive, is not limited to the particular means herein shown and described for hinging the doors in position, and any suitable construction may be employed for this purpose, and any suitable device or devices may also be employed for locking the seats in any desired position, and at $k$ in Figs. 4 and 6 I have shown catches or locks.

By means of this construction I provide a car which may be quickly and easily converted into an open car whenever desired and which may also whenever necessary be as quickly and easily converted into a closed car.

Having fully described my invention, what I claim as new, and desire to secure by Letters Patent, is—

1. A car, the side portions of which are composed of vertically-arranged hinged doors, said doors being provided with an opening, and a seat hinged in said opening and composed of a plurality of parts one of which forms a seat in any position of the door, and the other or others of which close the opening in the door in any position thereof, substantially as shown and described.

2. A car, the sides of which are provided with vertical stanchions arranged at regular intervals, the alternate stanchions being provided with doors which are hinged thereto, said doors being also provided with openings, and seats hinged in said openings, said seats being composed of a plurality of parts, substantially as shown and described.

3. A car, the sides of which are composed of doors hinged so as to swing vertically and inwardly, said doors being provided with openings in which are hinged seats composed of two or more parts, one part of said seats being always in position for use as a seat or seats and the other part or parts closing said openings in any position of the doors, substantially as shown and described.

In testimony that I claim the foregoing as my invention I have signed my name, in presence of the subscribing witnesses, this 18th day of January, 1904.

WILLIAM JAMES HERBERT.

Witnesses:
F. A. STEWART,
C. J. KLEIN.